June 16, 1953 — F. H. MUELLER ET AL — 2,642,257

VALVE STRUCTURE

Filed Aug. 19, 1949 — 2 Sheets-Sheet 1

INVENTORS:
Frank H. Mueller,
Walter J. Bowan,
BY Cushman, Darby & Cushman
ATTORNEYS.

June 16, 1953     F. H. MUELLER ET AL     2,642,257
VALVE STRUCTURE
Filed Aug. 19, 1949     2 Sheets-Sheet 2
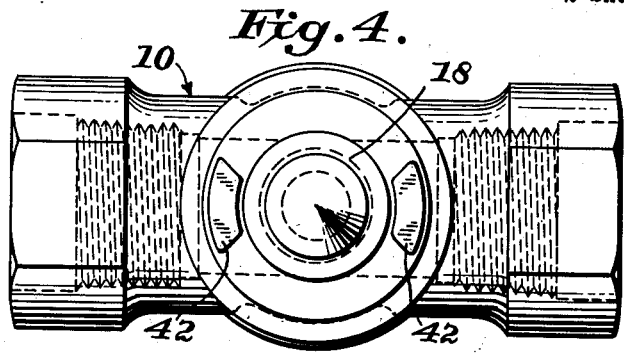
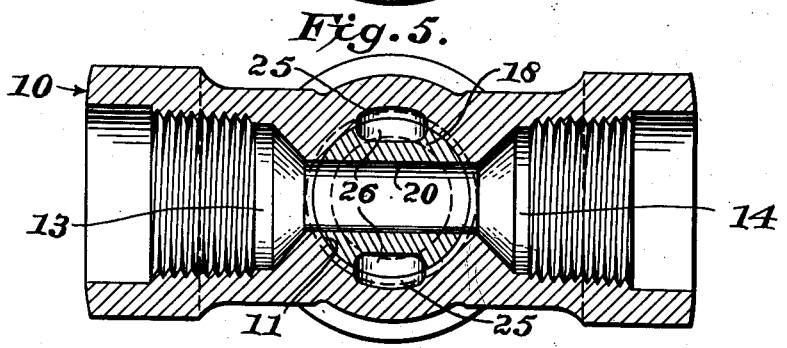
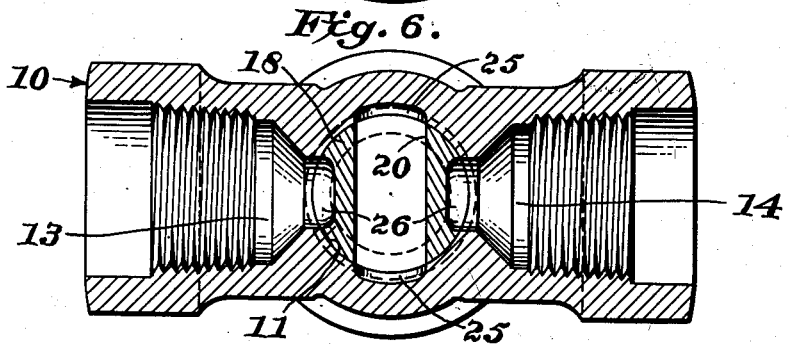
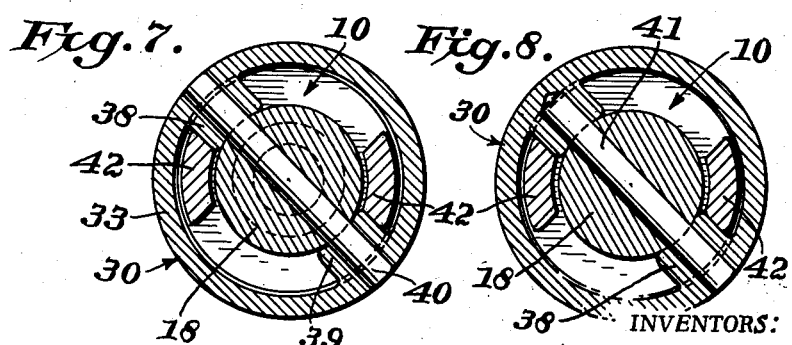

Patented June 16, 1953

2,642,257

UNITED STATES PATENT OFFICE 2,642,257

VALVE STRUCTURE

Frank H. Mueller and Walter J. Bowan, Decatur, Ill., assignors to Mueller Co., Decatur, Ill., a corporation of Illinois Application August 19, 1949, Serial No. 111,188

1 Claim. (Cl. 251—112)

The present invention relates to valve structures.

Objects of the invention are to provide a valve which can be produced at low cost and is of optimum simplicity and efficiency. Other objects and advantages of the invention will be apparent from the following specification and accompanying drawings wherein Figure 1 is an axial section through the valve structure;

Figure 4 is a plan elevation of the Figure 1 structure but with the abutment or cap of that view removed;

Figure 5 is a transverse section on the line 5—5 of Figure 1;

Figure 6 is a view similar to Figure 5 but with the plug in closed position;

Figure 7 is a transverse section on the line 7—7 of Figure 1; and

Figure 8 is a section similar to Figure 7 but showing a modified arrangement.

Figure 1:
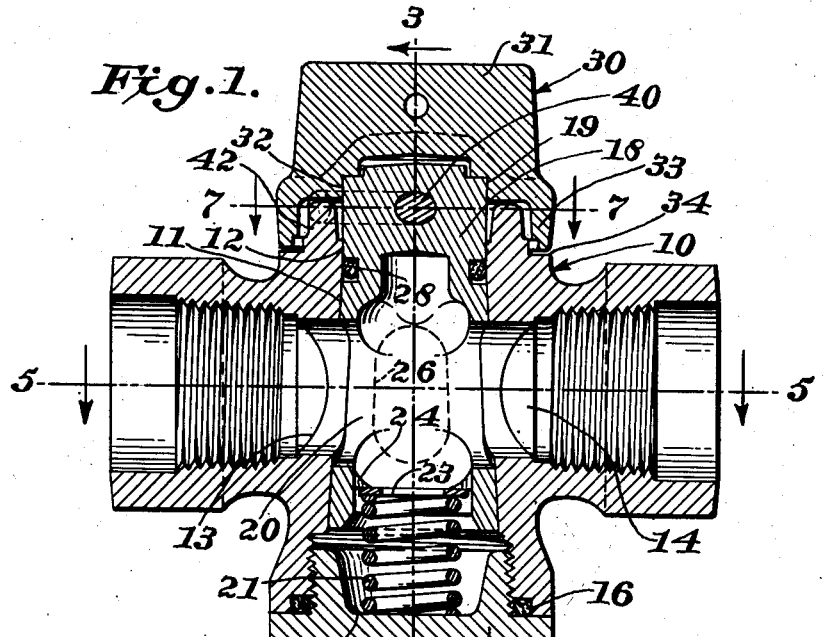

The valve structure comprises a casing 10 including a seat 11. Seat 11 is tapered throughout the major portion of its length but a short cylindrical portion 12 extends from the smaller end of the seat to the exterior of the casing. Flow passages 13 and 14 open to the seating surface 11, these passages being in alignment radially of seat 11 and lying normal to the axis of the seat. The larger end of seat 11 is closed by a threaded closure 15. A seal may be provided between the cap and the casing 10 by means of a packing ring 16.

The plug 18 is of tapered form but includes a cylindrical portion 19 projecting from its smaller end and to the exterior of casing 10. Plug 18 includes a flow passage 20. The plug is urged to seated position by means of a spring 21 fitted in a recess 22 in the closure 15, the inner end of the spring bearing upon an annular washer 23. Washer 23 bears upon diametrically opposite shoulders 24 formed in the larger end of the plug. It will be observed that the shoulders 24 do not close the larger end of the plug and a chamber open to fluid pressure, and in which the spring 21 is positioned, is thereby provided within the plug and in the larger end of the casing.

As is best shown in Figures 5 and 6, the seat 11 of casing 10 is provided with two diametrically opposite recesses 25 respectively positioned intermediate the mouths of the flow passages 13 and 14. These recesses are of the same outline as the mouths of the flow passages of the casing and the plug. Plug 18 is also provided with two diametrically aligned recesses designated 26 having the same outline as the flow passages and positioned intermediate the mouths of the plug flow passage 20. As is best shown in Figures 5 and 6, the recesses 26 in the plug are substantially deeper in a direction radially of the valve axis than the recesses 25 in the casing. By this arrangement, the casing wall will not be unduly weakened by its recesses. This is an important factor because the casing of a valve of this type is usually formed of cast iron. By making the recesses 26 in the plug of more substantial depth, the brass or bronze used in the plug can be saved and space is provided for an ample supply of grease.

The valve structure of the present invention is primarily intended as a curb or line stop for use in controlling the flow of gas under high pressure. Gas has a corrosive action on valves but if the recesses 25 and 26 are filled with grease, this corrosion can be prevented and, in addition, the valve can be kept lubricated against seizure.

With reference to preventing corrosion, it will be observed from Figure 6 that when the plug 18 is in closed position, the plug recesses 26 will be aligned with the mouths of the casing passages 13 and 14. Because the recesses have the same outline as the mouths of these passages, the presence of grease in the recesses 26 will preclude gas from acting upon the metal of the plug. With the plug in closed position, such gas as may be within the plug passage 20 will be prevented from acting upon the casing seating surface by the grease in the recesses 25 with which passage 20 is aligned.

By the arrangement just described, as well as because of the manner in which lubricant will be wiped upon the seating surface as hereinafter described, the gas cannot reach any portion of the seating surface of either the casing or plug when the plug is open or in closed position.

With regard to the lubricating and sealing effect of the grease in the recesses 25 and 26, it will be noted by reference to Figure 5 that when the plug is in open position and is then turned to closed position by counterclockwise rotation, the grease in the plug recesses 26 will be wiped upon the seat 11 of the casing. At the same time, the portion of the plug which moves past the casing recesses 25 will wipe grease from the last-mentioned recesses. Reverse rotation will further distribute the grease upon the seating surfaces so that these surfaces will be lubricated to form a tight seal. A further seal about the smaller end of the plug is afforded by the provision of a pressure deformable and bodily resilient packing ring 28 positioned in a groove extending about the plug, the groove being of different shape in cross section from that of the ring so that pressure within the groove can deform the ring into sealing engagement with the innermost wall of the groove and the opposed surface of the casing seat.

The cylindrical portion or shank 19 at the smaller end of the plug carries an abutment member 30 which also serves as a cap for the plug. The cap 30 includes a flattened portion 31 which provides a handle upon which a tool can be fitted. The inner portion of cap 30 is recessed as indicated at 32 to closely fit the cylindrical end portion 19 of the plug. Outwardly of recess 32 the abutment member or cap 30 includes a circumferential skirt 33 which projects axially toward the casing. The free end of skirt 33 is spaced a slight distance from a flat surface 34 on the casing when the plug is in seated position. If the plug becomes seized by reason of remaining in one position for a long period of time, it can be freed by tapping the cap 30 to thereby slightly unseat it. However, this unseating movement will be limited by the contact of the inner edge of the skirt 33 with the surface 34. In other words, the plug cannot be unseated to such an extent that fluid pressure can build up between the seating surfaces to prevent reseating by spring 21. It will be observed that the recesses 25 and 26 have their axial ends lying in the same transverse planes as the corresponding ends of the mouths of the passages, and these ends are spaced a substantial distance from the chamber in which spring 21 is positioned. Hence, it will not be possible to unseat the plug to such an extent that pressure moving from the spring chamber can reach the recesses to thereby prevent reseating of the plug.

As best shown in Figure 7, the abutment member or cap 30 is provided with diametrically opposite lugs 38 and 39 which extend radially inwardly from the skirt 33 to such an extent that they will be closely adjacent the cylindrical portion 19 of the plug. These lugs and the skirt are apertured to receive a steel pin 40 which extends diametrically of the plug and to each outer periphery of the skirt 33. Alternatively, the aperture of one lug could be closed at its outer end as shown in Figure 8 and a shorter pin 41 used.

The lugs 38 are arranged to engage stops 42 which project upwardly from casing 10 within skirt 33, such engagement limiting rotation of plug 18 between open and closed positions.

Figures 2, 3:
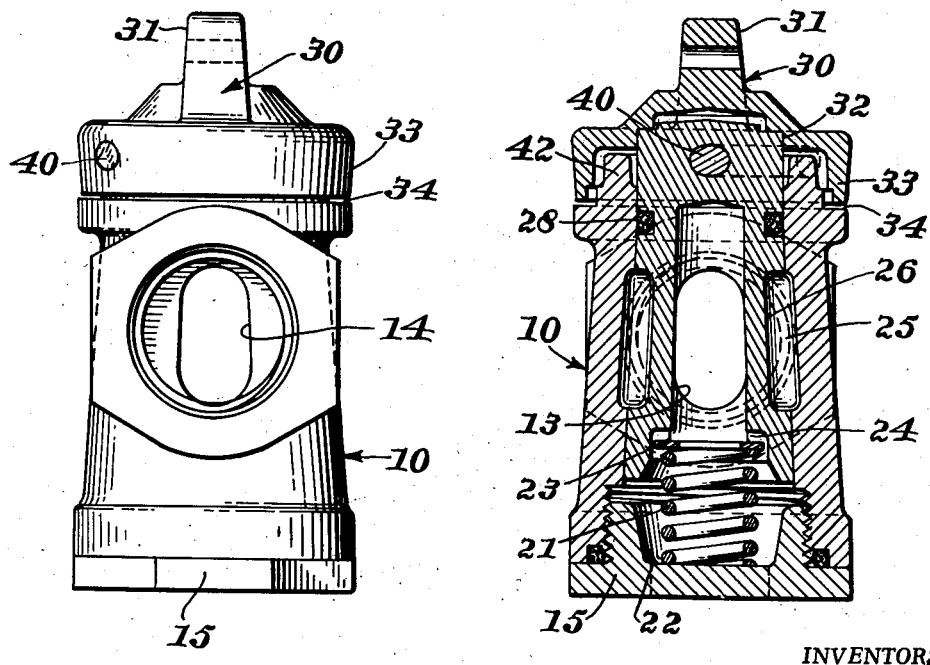
Figure 2 is an elevation looking toward Figure 1 from the right.
Figure 3 is an axial section on the line 3—3 of Figure 1.

It will be noted from Figure 3 that the pin 40 or 41 extends through a solid and relatively heavy portion of plug 18. This arrangement, plus the fact that the lugs 38 closely embrace the plug, insures that the pin will not be broken by any unseating blow upon the abutment or cap 30. Also, the fact that the pin is made of steel causes it to reinforce the abutment 30, which is cast of iron. In fact, because of this reinforcement, the lugs 42 need not be of great thickness.

The terminology used in the specification is for the purpose of description and not of limitation, the scope of the invention being indicated in the claim.

We claim:

In a rotary plug valve the combination comprising: a casing having a tapered seat and flow passages opening thereto; a tapered plug rotatable in said heat and having a flow port alignable with said casing passages; resilient means urging said plug to seat; a shank on the smaller end of said plug projecting exteriorly of said casing; an impact-receiving and turning-tool-engageable member on said shank, said member having a peripheral skirt depending into spaced adjacency with the opposed end of said casing to limit unseating movement of said plug; a pair of diametrically disposed lugs depending from said member radially-inwardly of said skirt; at least one corresponding upstanding lug on said opposed casing end engageable by said member lugs to limit rotation of said plug; and a pin extending diametrically through one side of said skirt, through one of said member lugs, through said shank, and at least partially into the other of said lugs to secure said member to said shank.

FRANK H. MUELLER.
WALTER J. BOWAN.

References Cited in the file of this patent

UNITED STATES PATENTS

| Number | Name | Date |
|---|---|---|
| 957,003 | Senn | May 3, 1910 |
| 1,813,815 | Possons | July 7, 1931 |
| 1,849,395 | Andrews | Mar. 15, 1932 |
| 1,898,577 | Ford | Feb. 21, 1933 |
| 2,122,721 | Nordstrom | July 5, 1938 |
| 2,133,580 | Searle | Oct. 18, 1938 |
| 2,342,664 | Haessler | Feb. 29, 1944 |

FOREIGN PATENTS

| Number | Country | Date |
|---|---|---|
| 32,011 | Germany | of 1885 |
| 149,382 | Great Britain | of 1920 |